Dec. 23, 1952     G. R. CHERVENKA ET AL     2,623,111
ELECTRICALLY OPERATED SIGNBOARD
Filed Oct. 13, 1949     7 Sheets-Sheet 1
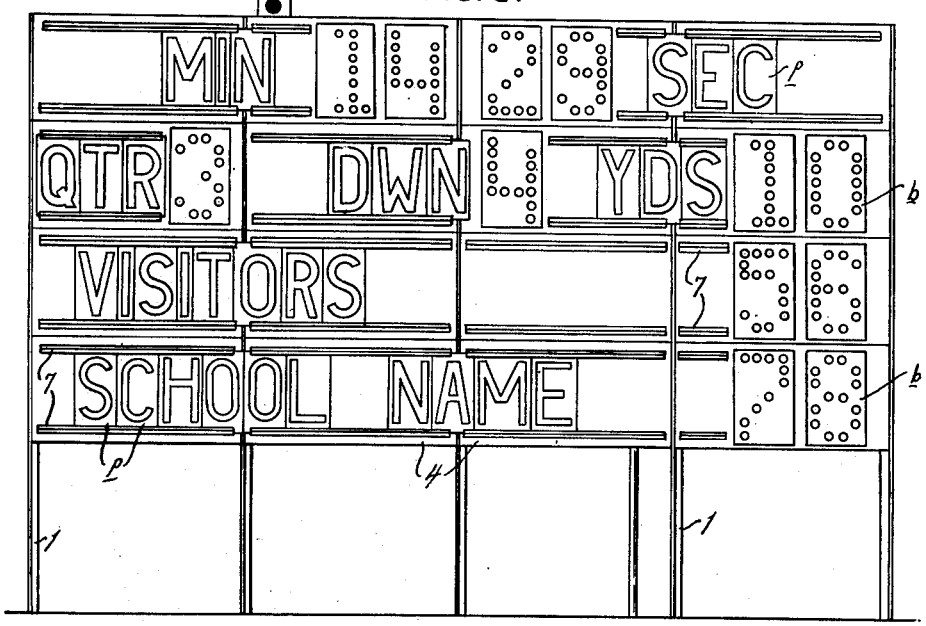
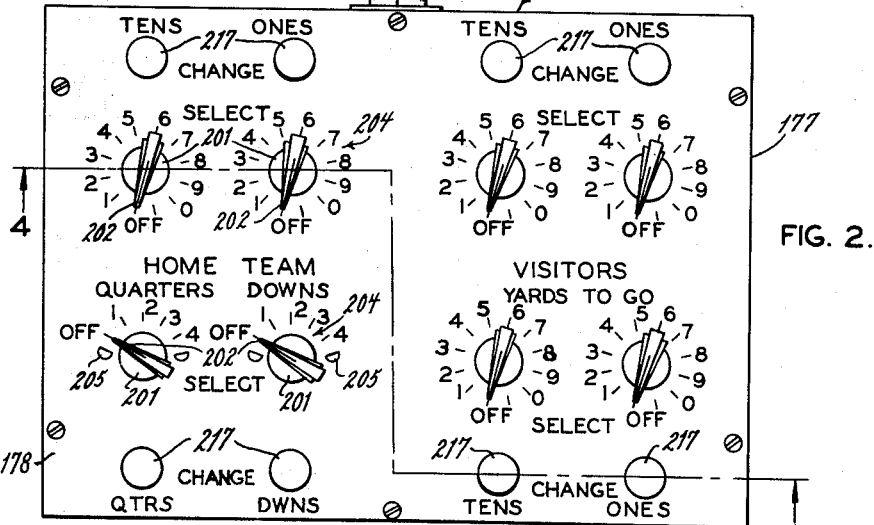
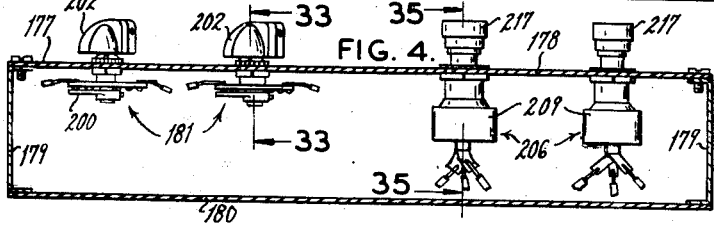
INVENTORS
GEORGE R. CHERVENKA
ROBERT E. KANE
BY *Alfred W. Petchaft*
ATTORNEY Dec. 23, 1952  G. R. CHERVENKA ET AL  2,623,111
ELECTRICALLY OPERATED SIGNBOARD
Filed Oct. 13, 1949  7 Sheets-Sheet 2
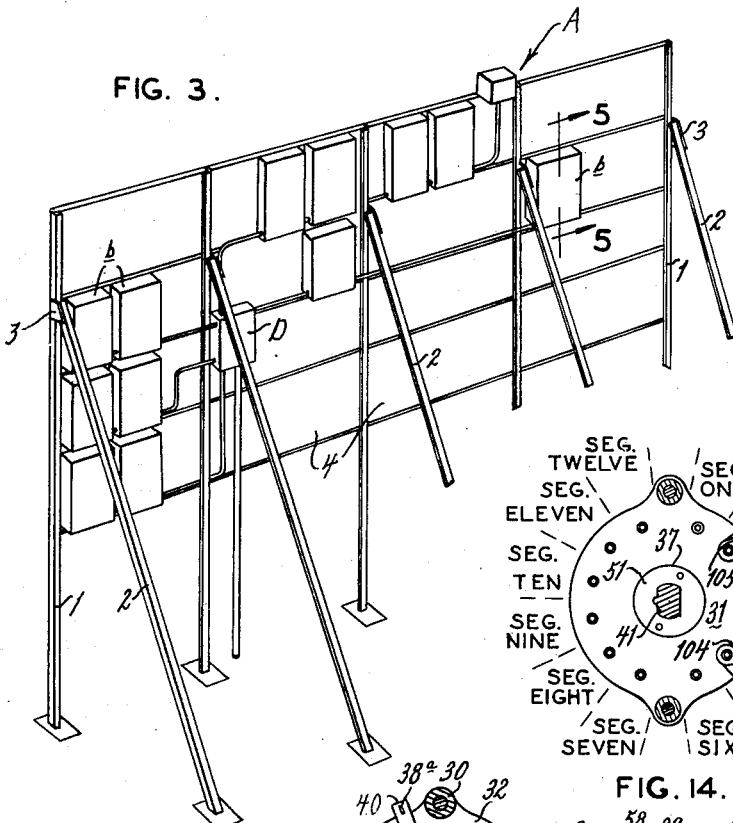
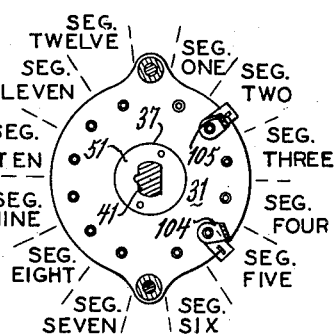
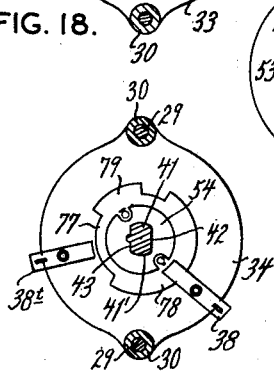
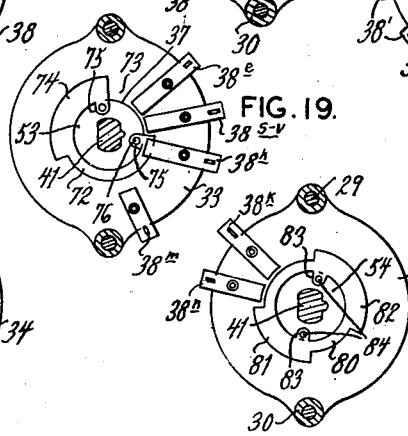
INVENTORS
GEORGE R. CHERVENKA
ROBERT E. KANE
BY
ATTORNEY Dec. 23, 1952    G. R. CHERVENKA ET AL    2,623,111
ELECTRICALLY OPERATED SIGNBOARD
Filed Oct. 13, 1949    7 Sheets-Sheet 3

INVENTORS
GEORGE R. CHERVENKA
BY ROBERT E. KANE
ATTORNEY

Dec. 23, 1952  G. R. CHERVENKA ET AL  2,623,111
ELECTRICALLY OPERATED SIGNBOARD
Filed Oct. 13, 1949  7 Sheets-Sheet 4
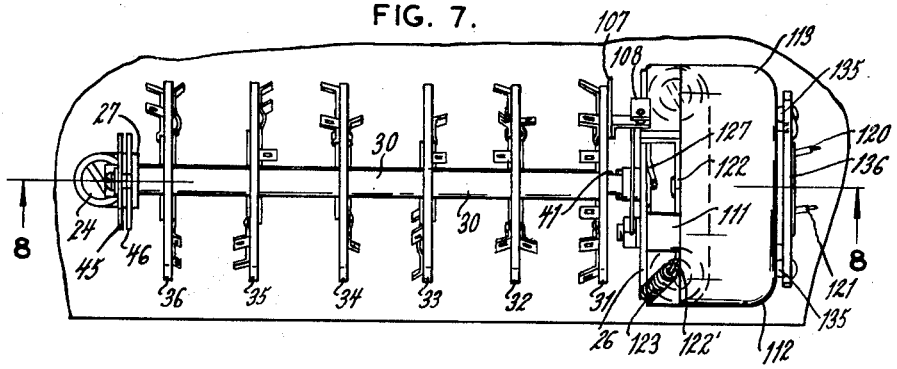
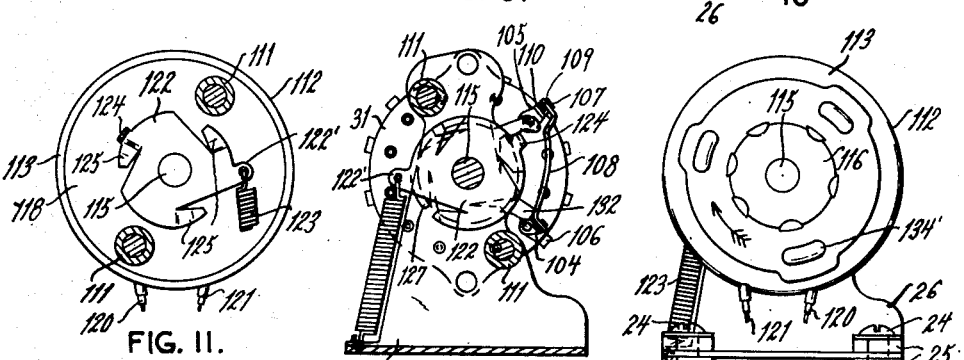
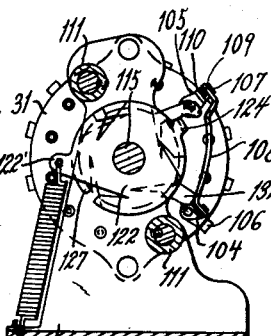
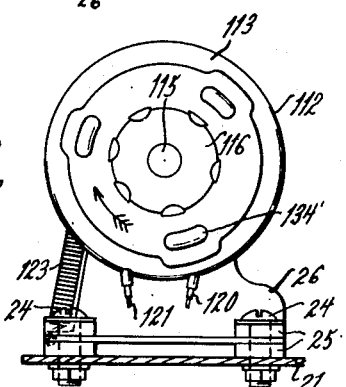
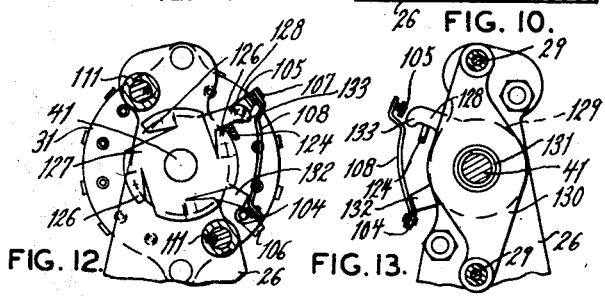
INVENTORS
GEORGE R. CHERVENKA
ROBERT E. KANE
BY Alfred W. Petchaft
ATTORNEY Dec. 23, 1952  G. R. CHERVENKA ET AL  2,623,111
ELECTRICALLY OPERATED SIGNBOARD
Filed Oct. 13, 1949  7 Sheets-Sheet 5

INVENTORS
GEORGE R CHERVENKA
ROBERT E. KANE
BY
ATTORNEY

INVENTORS
GEORGE R. CHERVENKA
ROBERT E. KANE
BY
ATTORNEY

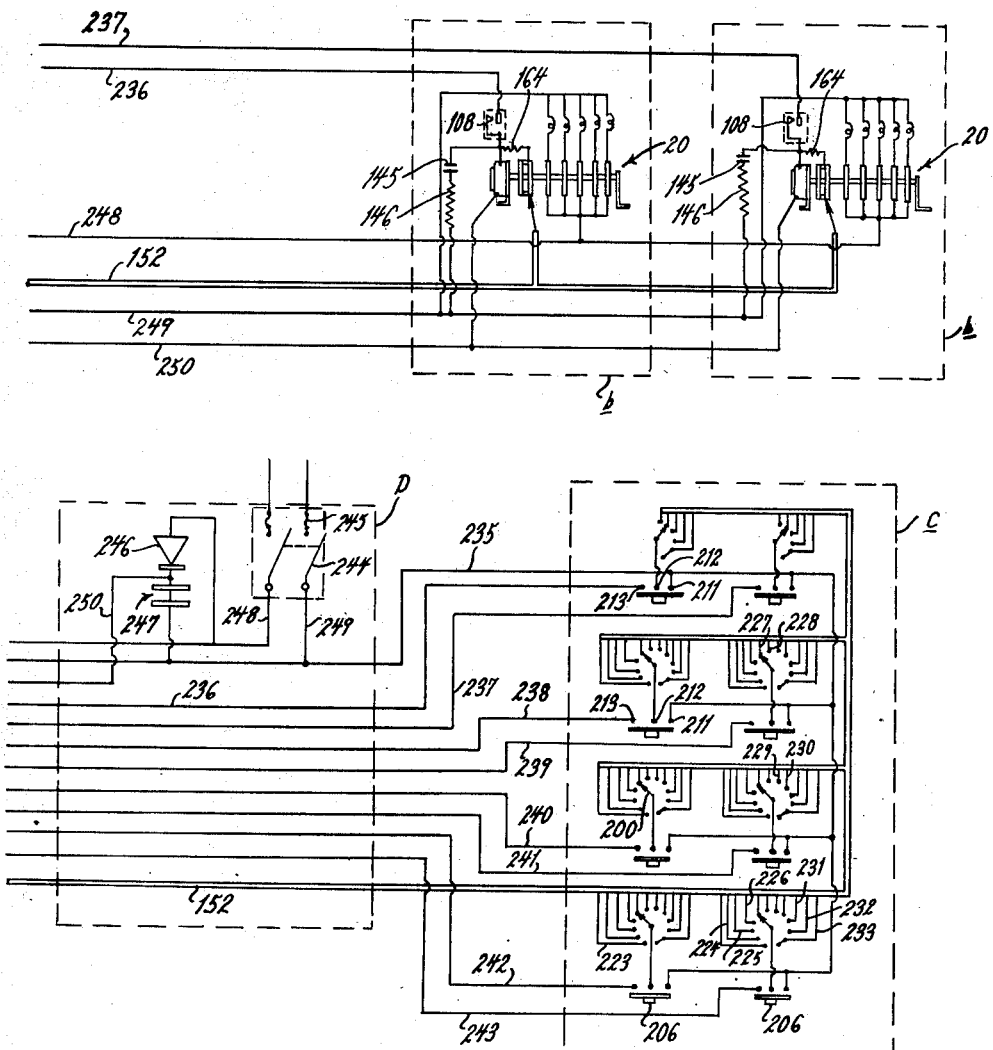

Patented Dec. 23, 1952

2,623,111

UNITED STATES PATENT OFFICE 2,623,111

ELECTRICALLY OPERATED SIGNBOARD

George R. Chervenka, St. Louis, and Robert E. Kane, Glendale, Mo., assignors to The Medart Company, St. Louis, Mo., a corporation of Missouri Application October 13, 1949, Serial No. 121,208

3 Claims. (Cl. 177—346)

This invention relates in general to visual signaling devices and more particularly to certain new and useful improvements in electrically actuated scoreboards and the like.

It is the primary object of the present invention to provide an electrically actuated scoreboard containing a plurality of light bulbs adapted for illumination by remote control means for presenting selected intelligible patterns.

It is a further object of the present invention to provide indicating panels which incorporate solenoid actuated rotary switch means for reliably effecting illumination of the requisite light bulbs forming any desired pattern.

It is an additional object of the present invention to provide a standardized type of indicating panel which may be utilized in any selected number to provide a scoreboard of any desired type or kind with the totality of such indicating panels so used being operated at a single remote point.

It is also an object of the present invention to provide a remote-control scoreboard consisting of a plurality of identical indicating panels which may all be connected to a unitary control box through a single main cable having one set of wires common to all panels and a set of wires adapted for selectively operating any one or more of the panels in any desired sequence through the common set of wires.

It is similarly an object of the present invention to provide a scoreboard of the type above stated in which any desired number of indicator panels may be readily plugged in on a suitable main cable to provide simple economical installation, maintenance, and repair and afford an exceptionally high degree of flexibility in design and arrangement.

It is a further object of the present invention to provide an indicating panel with associated operating members which are economically constructed and durable in use.

With the above and other objects in view, our invention resides in the novel features of form, construction, arrangement, and combination of parts presently described and pointed out in the claims.

In the accompanying drawings (7 sheets)—

Figure 1 is a front view of the scoreboard constructed in accordance with and embodying the present invention;

Figure 2 is a front view of the control box;

Figure 3 is a perspective view of the rear portion of the scoreboard;

Figure 4 is a transverse sectional view taken along line 4—4 of Figure 2;

Figure 7 is a top view of a rotary switch;

Figure 8 is a transverse sectional view taken along line 8—8 of Figure 7;

Figure 9 is a rear end view of the rotary switch;

Figure 33:
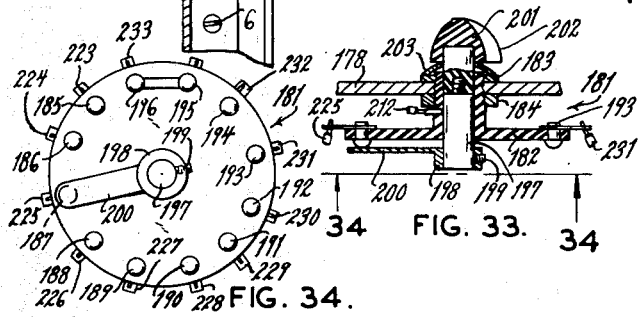
Figure 35:
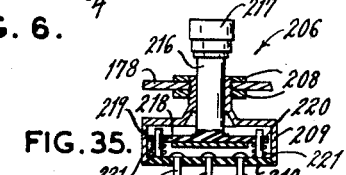
Figure 22:
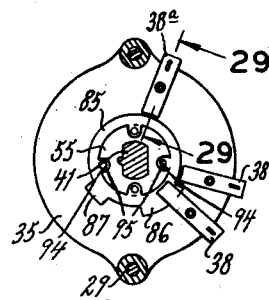
Figure 23:
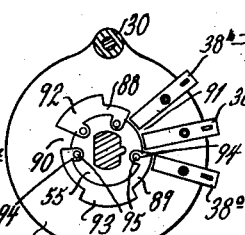
Figure 24:
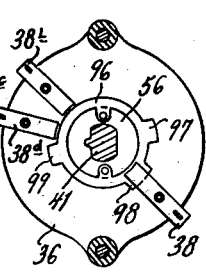
Figure 25:
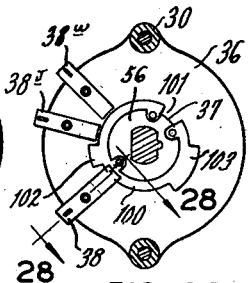
Figure 26:
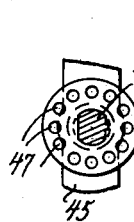
Figure 27:
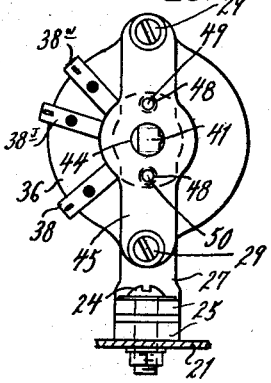
Figure 28:
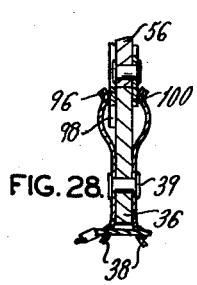
Figure 29:
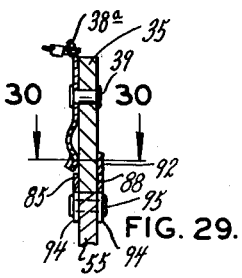
Figure 30:
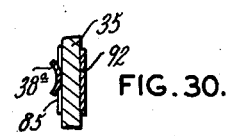
Figure 31:
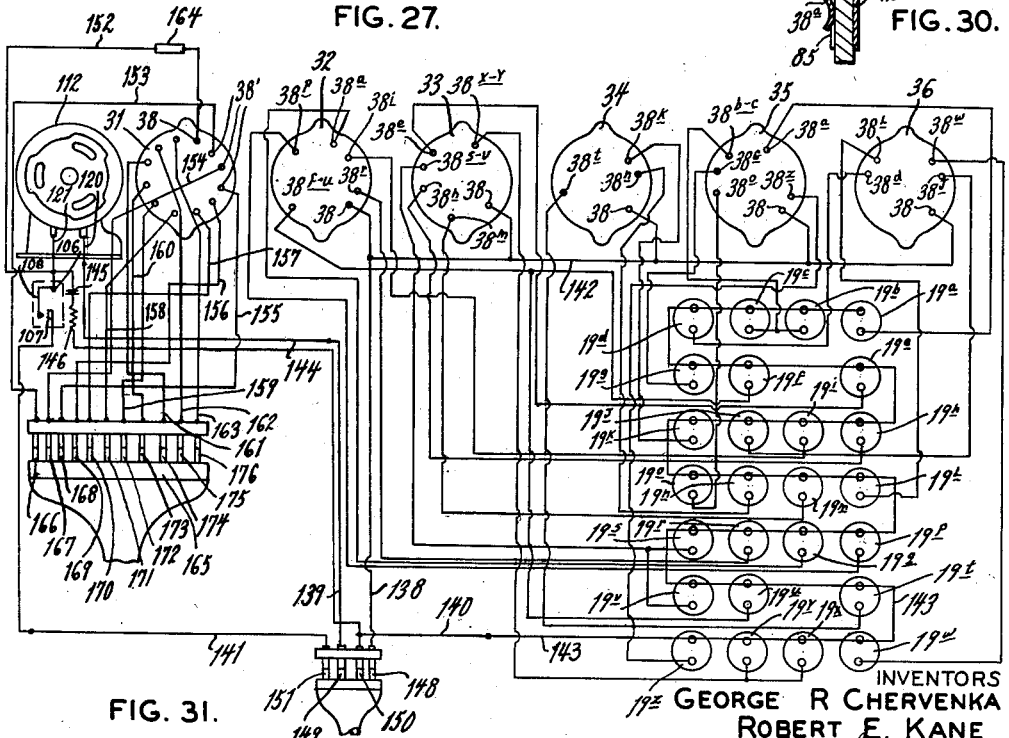
Figure 32:
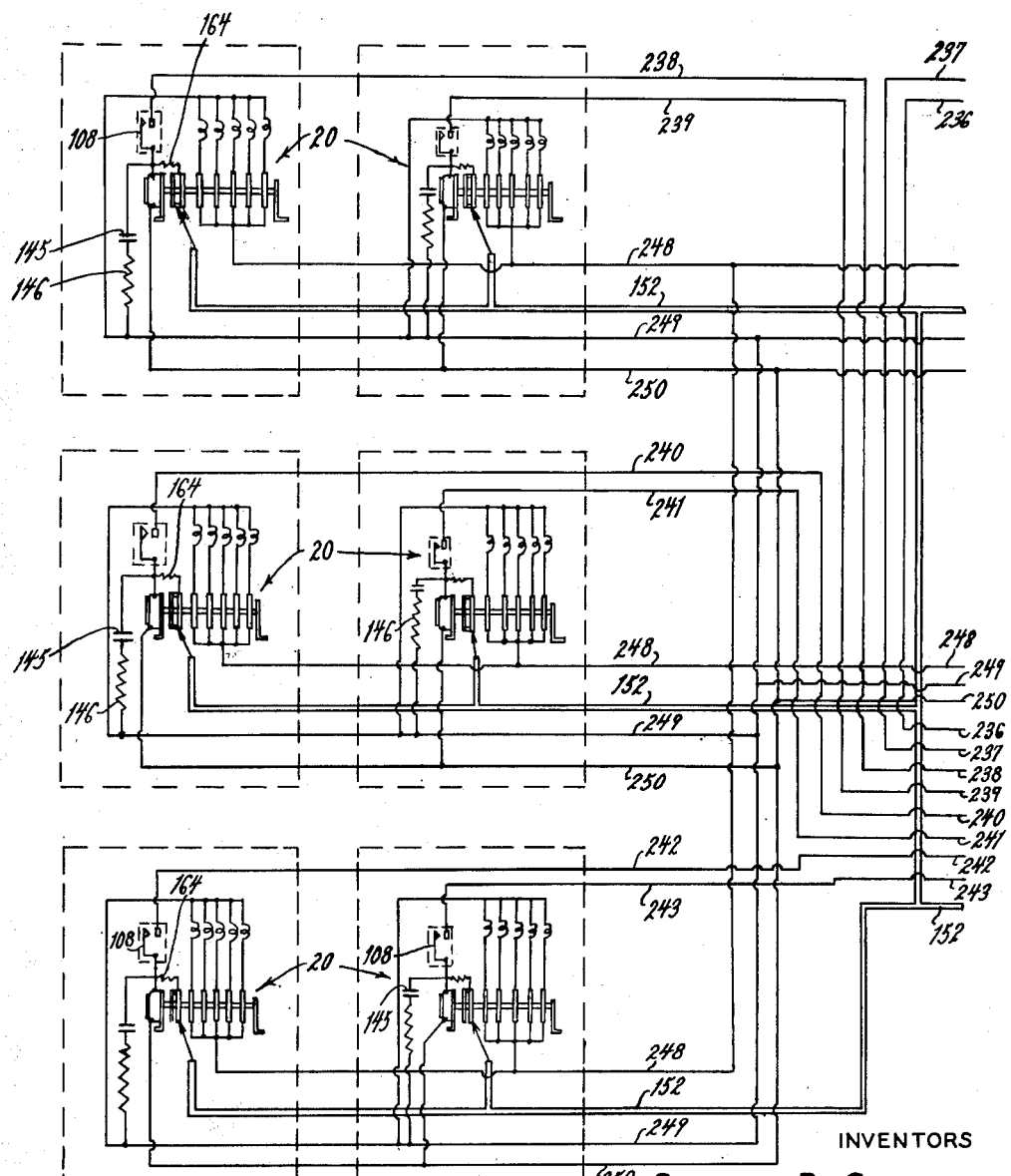

Figures 10 to 26, inclusive, are transverse sectional views taken respectively along lines 10—10, 11—11, 12—12, 13—13, 14—14, 15—15, 16—16, 17—17, 18—18, 19—19, 20—20, 21—21, 22—22, 23—23, 24—24, 25—25, and 26—26 of Figure 8;

Figure 27 is a front end view of the rotary switch;

Figure 28 is a transverse sectional view taken along line 28—28 of Figure 15;

Figure 29 is a transverse sectional view taken along line 29—29 of Figure 20;

Figure 30 is a transverse sectional view taken along line 30—30 of Figure 29;

Figure 31 is a schematic wiring diagram illustrating the electrical connections between the rotary switch and the lamp box which it is associated;

Figures 32 and 32a conjunctively constitute a schematic wiring diagram illustrating the various circuits between the control box and the switches; and Figures 33, 34, and 35 are fragmentary sectional views taken respectively along lines 33—33, 34—34, and 35—35 of Figure 4.

Referring now by reference characters to the drawings which illustrate a preferred embodiment of the present invention, A designates a scoreboard which, for purposes of example, is shown as adapted for use in a football field but may be used with equal facility for baseball, basketball, and other sports. The scoreboard A comprises a plurality of spaced uprights 1, preferably of angle sections, suitably secured at their lower ends in the ground or any other suitable supporting surface, and supported by braces 2 which are joined, at their upper ends, by gusset plates 3 to the uprights 1. Horizontally disposed between the uprights 1 is a plurality of rectangular panels 4 all of the same size and provided with rearwardly projecting peripheral flanges 5 having matching apertures for receiving bolts 6 by which the panels 4 are marginally secured to each other and to vertical uprights 1.

Provided on the outwardly presented faces of the panels 4 adjacent the upper and lower margins thereof are transversely extending guideways 7 for slidably receiving letter or numeral containing plates p which may be appropriately arranged to designate the necessary names and abbreviations associated with the particular sport. Herein, for example, the names of the contesting parties are merely presented as "Visitors" and "School name." The abbreviations "Min," "Sec," Qtr," Dwn," Yds," respectively, refer to "Minutes," "Seconds," "Quarter," "Down," "Yards." Openings 8 are for accommodating numeral-indicating panels or so-called lamp-boxes b, there being one such lamp-box b associated with the designation "Qtr" (Quarter) and "Dwn" (Down) and two of such lamp-boxes b, disposed in side by side relationship, associated with the other designations upon the scoreboard A for indication of the appropriate count, as will be shown more fully hereinafter.

Figures 5, 6:
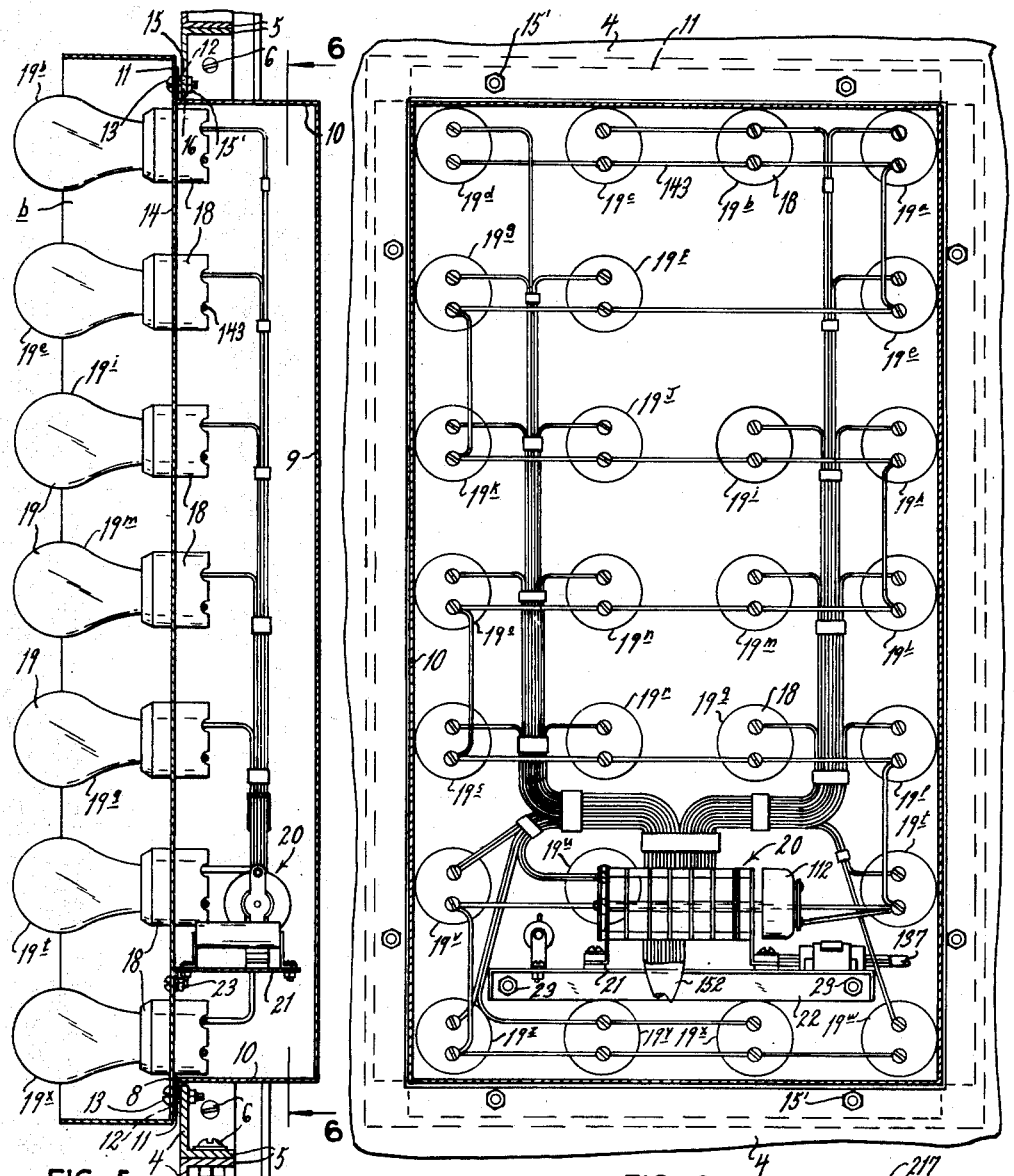
Figure 5 is a transverse sectional view taken along line 5—5 of Figure 3.
Figure 6 is a transverse sectional view taken along line 6—6 of Figure 5.

Each lamp-box b comprises a back plate 9 (see Figures 5 and 6) and side walls 10 having laterally outwardly projecting flanges 11 which are provided with spaced apertures 12 for receiving bolts 13 which extend through aligned apertures in a cover plate 14, and are engaged by nuts 15. The bolts 13 are elongated and project rearwardly through suitably aligned apertures 16 around the opening 8 for receiving a second nut 15' thereby rigidly securing the lamp-box b to the panel 4 with which it is associated. The cover plate 14 is turned forwardly at its margins in the provision of a peripheral guard-flange. Mounted in and extending through the cover plate 14 are twenty-six conventional electric lamp sockets 18, arranged in spaced, parallel, vertical rows (Figure 6), each provided with a lamp bulb 19. For purposes of clarification, the twenty-six bulbs are numbered 19a, 19b, 19c, 19d, 19e, 19f, 19g, 19h, 19i, 19j, 19k, 19l, 19m, 19n, 19o, 19p, 19q, 19r, 19s, 19t, 19u, 19v, 19w, 19x, 19y, and 19z, arranged in the lamp-boxes b, substantially in the following configuration:

| 19a | 19b | 19c | 19d |
|-----|-----|-----|-----|
| 19e |     | 19f | 19g |
| 19h | 19i | 19j | 19k |
| 19l | 19m | 19n | 19o |
| 19p | 19q | 19r | 19s |
| 19t |     | 19u | 19v |
| 19w | 19x | 19y | 19z |

It will be noted that there are no sockets 18 or bulbs 19 in the spaces beneath bulbs 19b and 19q because these spaces are not needed in any of the configurations or light patterns employed to form the digits "0" to "9," inclusive, as may be seen by reference to Figure 1.

Conventionally mounted upon the rearwardly presented face of the cover plate 14 is a rotary switch 20 adapted for controlling the light-circuits and establishing various number patterns. The rotary switch 20 comprises a base plate 21 having a suitably apertured depending flange 22 for accommodating bolts 23 by which it is secured to the rear side of the cover plate 14. Secured by means of bolts 24 and rubber washers 25 upon the base plate 21 is a pair of spaced parallel bearing plates 26, 27, and mounted in uniformly spaced parallel relation therebetween, by means of screw-posts 29 and tubular spacers 30, are six dielectric stator disks, 31, 32, 33, 34, 35, and 36, each centrally provided with a relatively large concentric aperture 37 and being subdivided around its periphery into twelve uniform segments or contact-positions which for convenience of reference herein may be designated as "stator segment one," "stator segment two," and so on, reading clockwise, around to "stator segment twelve" as shown in Figure 14. The several stator disks, 31, 32, 33, 34, 35, and 36 are each provided with a plurality of contact blades 38, 38', and 38a, 38b—c, 38d, 38e, 38f—u, 38g, 38h, 28i, 38j, 38k, 38l, 38m, 38n, 38o, 38p, 38q, 38r, 38s—v, 38t, 38w, 38x—y, 38z, which are each respectively connected to one terminal or lead from the lamps 19a to 19z inclusive. It will be noted that there are only twenty-two such lamp-connected contacts 38a to 38z inclusive as compared with twenty-six lamps for the reason that eight of the bulbs are paired, that is to say, bulbs 19b and 19c are paired and jointly connected to contact blade 38b—c, bulbs 19f and 19u are paired and jointly connected to contact blade 38f—u, bulbs 19s and 19v are paired and jointly connected to contact blade 38s—v and finally, bulbs 19x and 19y are paired and jointly connected to contact blade 38z—y. The contact blades 38, 38' and 38a to 38z inclusive are located in certain selected contact-positions or so-called "stator segments," and either upon the rear or front faces of the several stator disks, 31, 32, 33, 34, 35, and 36, as will presently be more fully described, the disk-faces shown in Figures 14, 16, 18, 20, 22, and 24, being referred to as "rear faces" and the disk faces shown in Figures 15, 17, 19, 21, 23, and 25 being referred to as "front faces." The contact blades 38, 38', and 38a to 38z, inclusive, are held in place by rivets 39 and are in turn provided with radially projecting connection lugs 40.

Journalled in and projecting at its ends through bearing plates 26, 27, is a shaft 41 which extends concentrically through the apertures 41' in each of the stator disks 31, 32, 33, 34, 35, 36, and is provided on diametrally opposite sides substantially throughout its entire length with flat faces 42, 43. At its outer end the shaft 41 projects through an aperture 44 in a spring leaf 45, spaced outwardly of the bearing plate 27. Mounted upon the shaft 41 for rotation therewith, intermediate the spring leaf 45 and the bearing plate 27, is a small metallic disk 46 (Figure 26) having twelve uniformly spaced apertures 47 disposed adjacent the periphery thereof in respective alignment with the stator segments. Similarly, the spring leaf 46 is provided with a pair of apertures 48 located for registration with two diametrally opposite apertures 47. Held under the tension of the spring leaf 43 between each pair of registering apertures 47, 48, are spherical balls 49, 50, thus providing a twelve-position ball-detent for purposes presently more fully appearing.

Fixed upon the shaft 41 for rotation therewith are six circular dielectric rotor disks 51, 52, 53, 54, 55, 56, sized for snug fitting rotation within the aperture 37, and respectively located in coplanar alignment with the stator disks 31, 32, 33, 34, 35, 36. Each of rotor disks 51, 52, 53, 54, 55, 56, may be said to be also divided into twelve segments corresponding to the segments of the stator disks 31, 32, 33, 34, 35, and 36, and when the rotary switch 20 is in "off" position, as shown in Figures 14 to 25, inclusive, "segment one" of each such rotor disk is radially aligned with the corresponding "segment one" of the stator disk with which it is operatively associated and the other segments are accordingly matched.

Secured upon the front face of the rotor disk 51 is a continuous annular contact element 57 having a radially outwardly extending contact tongue 58 located in segment "twelve." The contact blade 38 is located on the front face of the stator disk 31 in segment "one" and is a so-called "long blade," that is to say, it extends inwardly for continuous wiping contact with the annular contact element 57. In addition to this, the front face of the stator disk 31 is provided with eleven contact blades 38', each located in one of the other eleven segments, all of the contact blades 38' being so-called "short blades," that is to say, extending radially inwardly only far enough to contact the tongue 58 but not the annular contact element 57. The rear faces of the stator disk 31 and rotor disk 51 have no contact blades or contact elements and in effect may be said to be "dead" (Figures 14 and 15).

The front face of the rotor disk 52 is provided with an annular contact element 59 having a gap 60 in segment "twelve" and contact tongues 61, 62, respectively, in segments "seven" and "nine." The stator disk 32 correspondingly is provided with a long contact blade 38 located in segment "five" and short contact blades 38i, 38j—u, and 38p, respectively located in segments "two," "eight," and "eleven." The rear face of the rotor disk 52 is provided with an annular contact element 63, having a gap 64 located in segment "two" and contact tongues 65, 66, and 67 respectively located in segments "three," "five," and "eight." The rear face of stator disk 32 is provided with a long contact blade 38 in segment "five" and short contact blades 38a, 38r, and 38p, located respectively in segments "one," "four" and "eleven." It will be noted that stator disk 32 is provided with duplicate contact blades 38p mounted in back to back relation and electrically connected to each other.

The front face of the rotor disk 53 is provided with annular contact elements 68, 69, which are separated from each other by gaps 70, 71, respectively located in segments "five" and "twelve." Furthermore, it should be noted that the contact elements are wide throughout their arcuate lengths for contacting both long and short contact blades. The front face of stator disk 33 is provided with a long contact blade 38 located in segment "five" and a short contact blade 38x—y located in segment "one." The rear face of rotor disk 53 is provided with an annular contact element 72 having a gap 73 extending over segments "ten," "eleven," and "twelve" and a contact tongue 74 extending over segments "one," "two," "three," and "four." The contact elements 68, 69, 72, are provided with inwardly extending integral ears 75 which are aligned and connected through the body of the rotor disk 53 by metallic rivets 76. Thus the contact elements 68, 69, 72, are electrically connected to each other. The rear face of stator disk 33 is provided with long contact blades 38h, 38s—v, 38e, respectively located in segments "nine," "ten," and "eleven" and a short contact blade 38m located in segment "seven."

The front face of the rotor disk 54 is provided with an annular contact element 77 having a contact tongue 78 covering segments "two" to "seven," inclusive, and a contact tongue 79 covering segments "eleven" and "twelve.". The front face of stator disk 34 is provided with a long contact blade 38 located in segment "five" and a short contact blade 38t located in segment "nine." The rear face of the rotor disk 54 is provided with an annular contact element 80, having a contact tongue 81 covering segments "four" to "six," inclusive, and a contact tongue 82 covering segments "nine" to "twelve," inclusive. The contact elements 77, 80, are each provided with integral ears 83 which are electrically and structurally connected by a metallic rivet 84. The rear face of stator disk 34 is provided with short contact blades 38k, 38n, respectively located in segments "two" and "three."

The front face of rotor disk 55 is provided with an annular contact element 85 having a contact tongue 86 covering segments "five" and "six" and a contact tongue 87 covering segment "eight." The front face of stator disk 35 is provided with a long contact blade 38 located in segment "five" and short contact blades 38a, 38g, located respectively in segments "one" and "four." The rear face of rotor disk 55 is provided with two arcuate contact elements 88, 89 separated by a gap 90 across segment "three" and a gap 91 across segments "ten" and "eleven." The contact element 88 is provided with a contact tongue 92 covering segments "one" and "two," and contact element 89 is provided with a contact tongue 93 covering segments "six" and "seven." The contact elements 85, 88, 89, are also provided with a plurality of integral ears 94 which are structurally and electrically connected by metallic rivets 95. The rear face of stator disk 35 is provided with long contact blades 38g, 38b—c, respectively located in segments "ten" and "eleven," and a short contact blade 38o located in segment "nine."

The front face of rotor disk 56 is provided with an annular contact element 96 having contact tongues 97, 98, 99, respectively, located in segments "three," "five," and "nine." The front face of stator disk 36 is provided with a long contact blade 38 located in segment "five" and short contact blades 38d, 38l, respectively located in segments "ten" and "eleven." The rear face of rotor disk 56 is provided with an annular contact element 100 having a gap 101 across segment "eleven," a contact tongue 102 located in segment "four" and a contact tongue 103 covering segments "eight" and "nine." Finally, the rear face of stator disk 36 is provided with a long contact blade 38 located in segment "five" and short contact blades 38w, 38j, respectively located in segments "two" and "three."

The stator disk 31 is provided on its rear face and adjacent the periphery thereof with two spaced, rearwardly projecting arms 104, 105, respectively, having radially outwardly extending connection lugs 106, 107. Fixed at the end upon the arm 104 is a spring-blade or interrupter arm 108 projecting at its other end over the arm 105 and being provided with a contact point 109 adapted for circuit making and breaking contactive engagement with a similar contact point 110 mounted in the arm 105.

Rigidly secured upon the rear face of the bearing plate 26, by means of spacer sleeves 111, is a rotary solenoid 112 comprising an open-ended cylindrical cover 113 having a centrally apertured rear wall 114 extending through which is a stub shaft 115 provided on its outer end with a rigidly secured, concentric rotary armature 116. The stub shaft 115 is threadedly mounted in an internally threaded, stationary sleeve 117 concentrically fixed in an end plug 118 disposed closurewise across the open front end of the cover 113. It will be noted that the internal thread of the sleeve 117 is a very coarse pitch or "fast running"

thread which is, in effect, equivalent to a camming groove, so that when the armature 116 is pulled forwardly, the shaft 115 is rotated.

Mounted within the cover 113 and disposed concentrically around the shaft 115 is a doughnut-shaped electromagnetic coil 119 having two terminal leads 120, 121, extending through the cover 113, the lead 121 being connected directly to connection lug 106 so that the interrupter arm 108 is in series with the coil 119. The shaft 115 is axially aligned with the shaft 41 and on its forward end is provided with a driving ratchet wheel 122 having a radially outwardly extending arm 122' connected to one end of a coil spring 123 which serves to bias the armature 116 and stub shaft 115 rearwardly, and which is secured at its other end to the bottom portion of the bearing plate 26. The ratchet wheel 122 is provided with a forwardly extending finger 124 and a plurality of forwardly bent ratchet teeth 125 adapted for operative engagement with the rearwardly bent ratchet teeth 126 on a driven ratchet wheel 127 mounted upon the rearwardly projecting end of the shaft 41 (see Figure 12). It should be noted in connection herewith that the ratchet wheels 122, 127, are normally spaced axially from each other by a distance approximately equal to the amount of longitudinal movement of the shaft 115 and in such position are disengaged.

At its upwardly presented end the finger 124 will normally engage the underside of an elongated arm 128 projecting laterally from a dielectric plate 129, mounted loosely upon the shaft 41 in co-planar alignment with the interrupter arm 108. The plate 129 is held in surface abutting relation against the bearing plate 26 by a metallic plate 130 and a spring 131 encirclingly disposed about the shaft 41. Formed integrally with, and projecting laterally from the dielectric plate 129 is a second arm 132 which projects outwardly into the path of movement of the finger 124 whereby the dielectric plate 129 will be swung to and fro. On its outer end the arm 132 is provided with a cam lobe 133 adapted to contact the interrupter arm 108 and drive it outwardly for breaking the contact between the contact points 109, 110. The outer face of the cover wall 114 is provided with a plurality of arcuate recesses 134 arranged concentrically around the aperture 115 for receiving free-rolling ball members 135 which are maintained therein by an end plate 136 rigidly mounted on the rearwardly projecting end of the shaft 115 and being provided on its inner face with arcuate recesses 134' corresponding to the recesses 134 and adapted for complementary engagement with the ball members 135.

When the solenoid 112 is energized the magnetic coil 119 will drive the shaft 115 through a partial revolution until the circuit through the interrupter 108 is broken whereupon the shaft 115 will return to initial position and the interrupter 108 will close again re-establishing the circuit. The spatial relation between the ratchet teeth 125, 126, is such that the shaft 41 is moved through one-twelfth of a revolution for each movement of the shaft 115. Thus the shaft 41 is intermittently rotated in a step-by-step manner one-twelfth of a revolution at a time as long as electrical current is applied across the terminal 120 and the connection lug 107. It will be seen that each such step of movement corresponds to one segment of the stator disks 31, 32, 33, 34, 35, 36. Thus the rotary switch 20 may thus be said to have twelve positions which, for purposes of description herein, may be referred to as "first position," "second position," "third position," and so on up to "twelfth position," starting with the so-called "off" position shown in Figures 14 to 25, inclusive, in which segment "one" of each of the rotor disks 51 to 56, inclusive, is radially aligned with segment "one" of each of the stator disks 31 to 36, inclusive.

Responsive to the first impulse of current through the solenoid 112 the rotary switch 20 will progress to "second position" in which segment "twelve" of each rotor disk 51, 52, 53, 54, 55, 56, will be radially aligned with segment "one" of each stator disk 31, 32, 33, 34, 35, 36. As the rotary switch 20 passes through this "second position," lamp bulbs 19f, 19g, 19k, 19m, 19r, 19s, 19u, 19v, will blink on momentarily. The rotary switch 20 however, never stops in "second position" so the light pattern thus formed, which is meaningless, need not be traced out.

Responsive to the second impulse through the solenoid 112, the rotary switch 20 will move into "third position," in which segment "twelve" of each rotor disk 51, 52, 53, 54, 55, 56, will be opposite segment "two" of each corresponding stator disk 31, 32, 33, 34, 35, 36. In this position, contact blades 38b—c, 38g, will be in contact with contact element 89; contact blades 38e, 38l, 38h, 38s—v, will be in contact with contact element 72; contact blade 38x—y will be in contact with contact element 69; contact blade 38k will be in contact with contact tongue 82; contact blade 38o will be in contact with contact tongue 93; and contact blade 38p will be in contact with contact tongue 62, and assuming the various necessary electrical circuits of the scoreboard to be energized, as will be presently more fully described, the following light pattern will be formed:

```
         19b   19c 19e              19g 19h              19k 19l              19o 19p              19s 19t              19v 19x   19y
```

This light pattern will, when remotely viewed, read "0."

Responsive to the third impulse through the solenoid 112 the rotary switch 20 will move into "fourth position" in which segment "twelve" of each rotor disk 51, 52, 53, 54, 55, 56, will be opposite segment "three" of each corresponding stator disk 31, 32, 33, 34, 35, 36. In this position the contact blades 38e, 38h, 38s—v, will be in contact with contact element 72; contact blade 38b—c will be in contact with contact element 89; contact blade 38g will be in contact with contact element 69 and contact tongue 93; contact blades 38k, 38n, will be in contact with contact tongue 82; contact blade 38t will be in contact with contact tongue 78; contact blade 38x—y will be in contact with contact element 69; contact blade 38m will be in contact with contact tongue 74; and, assuming the various necessary electrical circuits of the scoreboard to be energized, as will be presently more fully described, the following light pattern will be formed:

19b 19c
  19e    19g
  19h    19k
    19m 19n 19o
       19s
  19t    19v
    19x 19y

This pattern will, when remotely viewed, read "9."

Responsive to the fourth impulse through the solenoid 112 the rotary switch 20 will move into "fifth position" in which segment "twelve" of each rotor disk 51, 52, 53, 54, 55, 56, will be opposite segment "four" of each corresponding stator disk 31, 32, 33, 34, 35, 36. In this position the contact blades 38b—c, 38g, will be in contact with contact element 89 and contact tongue 93; contact blades 38s—v, 38e, 38h, will be in contact with contact element 72; contact blades 38k, 38n, will be in contact with contact tongue 82; contact blade 38m will be in contact with contact tongue 74; contact blade 38p will be in contact with contact tongue 61; contact blade 38t will be in contact with contact tongue 78; contact blade 38x—y will be in contact with contact element 69; contact blade 38p is in contact with contact tongue 67 but is dead because gap 64 is opposite contact blade 38; and, assuming the various necessary electrical circuits of the scoreboard to be energized, as will be presently more fully described, the following light pattern will be formed:

19b 19c
  19e    19g
  19h    19k
    19m 19n
  19p    19s
  19t    19v
    19x 19y

This pattern will, when remotely viewed, read "8."

Responsive to the fifth impulse through the solenoid 112 the rotary switch 20 will move into "sixth position" in which segment "twelve" of each rotor disk 51, 52, 53, 54, 55, 56, will be opposite segment "five" of each corresponding stator disk 31, 32, 33, 34, 35, 36. In this position the contact blade 38a will be in contact with contact tongue 87; contact blade 38b—c will be in contact with contact element 89 and contact tongue 93; contact blade 38d will be in contact with contact tongue 98; contact blade 38g will be in contact with contact element 89; contact blades 38k, 38n, will be in contact with contact tongue 82; contact blade 38q will be in contact with contact tongue 69; contact blade 38t will be in contact with contact tongue 78; contact blade 38w will be in contact with contact tongue 103; contact blades 38l, 38s—v, 38h, are in contact with contact element 72; contact blade 38m is in contact with contact tongue 74; contact blade 38x—y is in contact with contact element 69, but is dead because the gap 71 is opposite contact blade 38. Similarly, contact blade 38i is in contact with contact tongue 62 but is dead because gap 60 is opposite contact blade 38; and, assuming the various necessary electrical circuits of the scoreboard to be energized, as will be presently more fully described, the following light pattern will be formed:

19a 19b 19c 19d
        19g
      19k
    19n
    19q
  19t
  19w

This pattern will, when remotely viewed, read "7."

Responsive to the sixth impulse through the solenoid 112 the rotary switch 20 will move into "seventh position" in which segment "twelve" of each rotor disk 51, 52, 53, 54, 55, 56, will be opposite segment "six" of each corresponding stator disk 31, 32, 33, 34, 35, 36. In this position the contact blades 38b—c, 38g, will be in contact with contact element 89; contact blade 38e, will be in contact with contact element 72; contact blades 38h, 38s—v, will be in contact with contact element 72 and contact tongue 74; contact blade 38l will be in contact with contact tongue 98; contact blade 38m will be in contact with contact tongue 74; contact blade 38n will be in contact with contact tongue 82; contact blade 38p will be in contact with contact tongue 66; contact blade 38t will be in contact with contact tongue 78; contact blade 38x—y will be in contact with contact element 69; contact blades 38w, 38j, are in contact with contact tongue 103 but are dead because the gap 101 is opposite contact blade 38; and assuming the various necessary electrical circuits of the scoreboard to be energized, as will be presently more fully described, the following light pattern will be formed:

19b 19c
  19e    19g
  19h
  19l 19m 19n
  19p    19s
  19t    19v
    19x 19y

This pattern will, when remotely viewed, read "6."

Responsive to the seventh impulse through the solenoid 112 the rotary switch 20 will move into "eighth position" in which segment "twelve" of each rotor disk 51, 52, 53, 54, 55, 56, will be opposite segment "seven" of each corresponding stator disk 31, 32, 33, 34, 35, 36. In this position the contact blade 38a will be in contact with contact tongue 86; contact blade 38b—c will be in contact with contact element 89; contact blade 38d will be in contact with contact tongue 97;

contact blades 38e, 38h, 38s—v, will be in contact with contact element 72 and tongue 74; contact blade 38i will be in contact with contact tongue 61; contact blade 38j will be in contact with contact tongue 103; contact blade 38o will be in contact with contact tongue 92; contact blade 38t will be in contact with contact tongue 78; contact blade 38x—y will be in contact with contact element 69; and, assuming the various necessary electrical circuits of the scoreboard to be energized, as will be presently more fully described, the following light pattern will be formed:

```
19a  19b  19c  19d
19e
19h  19i  19j
              19o
              19s
19t           19v
     19x  19y
```

This pattern will, when remotely viewed, read "5."

Responsive to the eighth impulse through the solenoid 112 the rotary switch 20 will move into "ninth" position in which segment "twelve" of each rotor disk 51, 52, 53, 54, 55, 56, will be opposite segment "eight" of each corresponding stator disk 31, 32, 33, 34, 35, 36. In this position the contact blade 38a will be in contact with contact tongue 86; contact blades 38e, 38h, 38s—v, will be in contact with contact element 72 and contact tongue 74; contact blade 38l will be in contact with contact tongue 97; contact blades 38g, 38o, will be in contact with contact tongue 92; contact blade 38k will be in contact with contact tongue 81; contact blade 38p will be in contact with contact tongue 65; contact blade 38q will be in contact with contact tongue 66; contact blade 38r will be in contact with contact tongue 67; contact blade 38z will be in contact with contact tongue 87; and, assuming the various necessary electrical circuits of the scoreboard to be energized, as will be presently more fully described, the following light pattern will be formed:

```
19a
19e       19g
19h       19k
19l       19o
19p  19q  19r  19s
          19v
          19z
```

This pattern will, when remotely viewed, read "4."

Responsive to the ninth impulse through the solenoid 112 the rotary switch 20 will move into "tenth" position in which segment "twelve" of each rotor disk 51, 52, 53, 54, 55, 56, will be opposite segment "nine" of each corresponding stator disk 31, 32, 33, 34, 35, 36. In this position the contact blades 38b—c, 38g, will be in contact with contact tongue 92; contact blades 38e, 38s—v, will be in contact with contact element 72 and contact tongue 74; contact blades 38k, 38n, will be in contact with contact tongue 81; contact blade 38t will be in contact with contact tongue 79; contact blade 38x—y will be in contact with contact element 68; and assuming the various necessary electrical circuits of the scoreboard to be energized, as will be presently more fully described, the following light pattern will be formed:

```
     19b  19c
19e       19g
          19k
     19n
          19s
19t       19v
     19x  19y
```

This pattern will, when remotely viewed, read "3."

Responsive to the tenth impulse through the solenoid 112 the rotary switch 20 will move into "eleventh position" in which segment "twelve" of each rotor disk 51, 52, 53, 54, 55, 56, will be opposite segment "ten" of each corresponding stator disk 31, 32, 33, 34, 35, 36. In this position the contact blade 38b—c will be in contact with contact tongue 92; contact blade 38e will be in contact with contact element 72 and contact tongue 74; contact blade 38g will be in contact with contact element 88; contact blades 38k, 38n, will be in contact with contact tongue 81; contact blade 38q will be in contact with contact tongue 65; contact blade 38t will be in contact with contact tongue 79; contact blade 38w will be in contact with contact tongue 102; contact blade 38x—y will be in contact with contact element 68; contact blade 38z will be in contact with contact tongue 86; and, assuming the various necessary electrical circuits of the scoreboard to be energized as will be presently more fully described, the following light pattern will be formed:

```
     19b  19c
19e       19g
          19k
     19n
19q
19t
     19w  19x  19y  19z
```

This pattern will, then remotely viewed, read "2."

Responsive to the eleventh impulse through the solenoid 112 the rotary switch 20 will move into "twelfth position" in which segment "twelve" of each rotor disk 51, 52, 53, 54, 55, 56, will be opposite segment "eleven" of each corresponding stator disk 31, 32, 33, 34, 35, 36. In this position the contact blade 38b—c will be in contact with contact element 68; contact blade 38f—u will be in contact with contact tongue 62; contact blade 38j will be in contact with contact tongue 102; contact blade 38n will be in contact with contact tongue 81; contact blade 38r will be in contact with contact tongue 66;

contact blade 38x—y will be in contact with contact element 68; contact blade 38z will be in contact with contact tongue 86; and, assuming the various necessary electrical circuits of the scoreboard to be energized as will be presently more fully described, the following light pattern will be formed:

```
      19b  19c
          19f
          19j
          19n
          19r
          19u
      19x  19y  19z
```

This pattern will, when remotely viewed, read "1."

Responsive to the next impulse through the solenoid 112 the rotary switch 20 will complete one full revolution and return to its initial position, that is to say, "first" or "off" position, in which all light circuits are dead.

Each lamp-box b is provided with a four-wire cable 137 containing four single lead-wires 138, 139, 140, 141. The lead-wire 138 is connected within the lamp-box b (see Figure 31) to a lead wire 142 common to the several contact blades 38 on stator disks 32, 33, 34, 35, 36 (but not the contact blade 38 of stator disk 31). As has been above-stated, one terminal of each of the lamp bulbs 19a to 19z, inclusive, is connected to its corresponding contact blade 38a to 38z, inclusive, of the rotary switch. The other terminal of each of the lamp bulbs is connected to a common lead wire 143 and the lead wire 140 is connected within the lamp box b to this common lead wire 143. The lead wire 139 is connected, within the lamp box b, through the lead wire 144 to the terminal or lead wire 120 of the coil 119. The lead wire 141 is connected within the lamp box b to the connection lug 107 and thence through the interrupter arm 108 to the other lead 121 of the coil 119. The connection lug 106 is grounded to the prong 150 through a small condenser 145 and resistor 146 which are connected to each other in series and function to suppress sparks and arcing between the contact points 109, 110, and elsewhere in the control circuits. The other end of the cable 138 is provided with a four-pronged connector plug 147 in which the four prongs 148, 149, 150, and 151, are respectively connected to lead wires 138, 139, 140, 141.

Each lamp box b is also provided with an eleven wire cable 152 containing eleven single lead wires, 153, 154, 155, 156, 157, 158, 159, 160, 161, 162, 163, respectively connected within the lamp-box b to the contact blades 38' of stator disk 31 in the rotary switch 20, the lead wire 153 being connected to the contact blade 38' of segment "two," the lead wire 154 being connected to the contact blade 38' of segment "three" and so on consecutively around to lead wire 163, which is connected to the contact blade 38' of segment "twelve." It will be noted that there is no lead wire in cable 152 to correspond to the contact blade 38 of segment "one" and that such contact blade 38, which may be referred to as the "take-off contact blade," is connected, through a hold-in resistor 164, to lead 121 of the solenoid coil 119.

At its other end the cable 152 is provided with a connector plug 165 having eleven prongs 166, 167, 168, 169, 170, 171, 172, 173, 174, 175, 176 which are respectively connected to lead wires 153, 154, 155, 156, 157, 158, 159, 160, 161, 162, and 163.

Located at any remote point, such as the press booth in a stadium, or, if the particular sport is indoors, at the official scorer's table in an arena is a control box c comprising a rectangular box 177 having a dielectric face-panel 178, four side walls 179, and a bottom wall 180. Suitably mounted on and depending from the face-panel 178 are a plurality of identical cycle selector switches 181. Since the presently described scoreboard A has been shown with eight lamp boxes, as would render it suitable for football games, the control box c is shown with eight switches 181.

Each of the selector switches 181 comprises an externally threaded mounting sleeve 182 extending through the panel 178 and held rigidly in place by lock nuts 183, 184. Fixed upon the lower end of the sleeve 182 and disposed concentrically therearound in downwardly spaced parallel relation to the panel 178 is a dielectric disk having twelve uniformly spaced contact buttons, 185, 186, 187, 188, 189, 190, 191, 192, 193, 194, 195, 196, arranged concentrically around the sleeve 182. Rotatably mounted in and extending through the sleeve 182 is a shaft 197 provided on its lower projecting end with a collar 198 held rigidly thereon by a set screw 199 and integrally provided with a radial contact arm 200 adapted for wiping contactive engagement with the contact buttons 185, 186, 187, 188, 189, 190, 191, 192, 193, 194, 195, 196. The shaft 197 fits snugly enough within the sleeve 182 to maintain good electrical contact therewith.

At its upper end the shaft 197 projects upwardly above the sleeve 182 and is molded into a dielectric knob 201 having a radial pointer 202 vertically aligned with the contact arm 200. Interposed between the upper end of the sleeve 182 and the under face of the knob 201 is a dished spring washer 203 for biasing the shaft 197 and contact arm 200 upwardly. The pointer 202 sweeps over a dial 204 stencilled or otherwise imprinted upon the face of panel 178. It will be noted by reference to Figure 2 that six of said dials 204 have twelve indicator marks or graduations representing the digits one to nine, zero and two "off" positions. These six dials, arranged in pairs, are associated with the lamp boxes b on the scoreboard A which indicate the "Visitors" and the "Home team" scores and the "yards." The arrangement in pairs thus provides means for indicating the appropriate number whether it be in single units or in two digits, the right hand dial 204 of each of said pairs as shown in Figure 2 being employed to indicate "units" digits and the other or left hand dial 204 being employed to indicate "tens" digits. "Downs" are provided with but five positions comprising the numerals one to four, inclusive, and an "off" position conventional limit stops 205 being mounted in the panel 178 to prevent further movement. The various indicated positions upon the dials 204 are each vertically aligned with one of the contact buttons 185 to 196, so that the graduation reading "0" corresponds to contact button 185, the graduation reading "9" corresponds to contact button 186, and so on in descending order around to the graduation reading "1" which corresponds to the contact button 194. The two contact buttons 195, 196 correspond to the two off positions and are connected together.

Mounted in and depending from the panel 178, in association with each selector switch is a manual control switch 206 comprising an externally threaded mounting sleeve 207 extending through, and held securely to, the panel 178 between lock nuts 208. Rigidly mounted on the lower end of the sleeve 207 is a hollow rectangular box-like housing 209 formed of dielectric material and having a flat bottom wall 210 provided with three spaced contact buttons 211, 212, 213; and two upstanding vertical pins 214, 215, arranged in a straight line. Mounted in and projecting through the sleeve 207 is a plunger-rod 216 provided at its upper end with a dielectric push-button or knob 217. At its lower end the plunger-rod 216 projects into the hollow interior of the housing 209 and is provided with a dielectric cross bar 218 having apertures 219, 220, for sliding disposition around the pins 214, 215, respectively. Coiled around the pins 214, 215, between the under face of the bar 218 and the upper face of the wall 210, are compression springs 221, respectively, for normally biasing the bar 218 and its associated plunger-rod 216 upwardly. On its under face the cross bar 218 is provided with a metallic conductor plate adapted to engage and simultaneously interconnect the three contact buttons 211, 212, 213, when the cross bar 218 is shifted downwardly upon downward movement of the plunger-rod 216 responsive to corresponding manual actuation of the push-button 217.

The control box c is provided with an eleven-wire cable 222, containing eleven single lead wires, 223, 224, 225, 226, 227, 228, 229, 230, 231, 232, 233, which respectively correspond to the lead wires 153, 154, 155, 156, 157, 158, 159, 160, 161, 162, 163. The lead wire 223 is connected in common to all contact buttons 186 of the several selector switches 181, similarly, the lead wire 224 is connected in common to all the contact buttons 187, and so on, consecutively, to lead wire 232 which is connected in common to all contact buttons 194. The lead wire 233, which may be referred to as the "off-position" wire is connected in common to each of the pairs of internally connected contact buttons 195—196. It should be noted in this connection that the two selector switches 181 which have only four digits and an "off" position are correspondingly connected to the lead wires of the cable 222; that is to say, contact buttons 191, 192, 193, 194, and 195—196 are connected to lead wires 229, 230, 231, 232, and the "off position" wire 233 respectively, the remaining contact buttons being unused and hence not connected.

Also running into the control box c is a nine-wire cable 234 having nine single lead wires, 235, 236, 237, 238, 239, 240, 241, 242, and 243. The lead wire 235 is connected in common to contact button 211 within each of the several manual control switches 206. Each of the lead wires 236, 237, 238, 239, 240, 241, 242, and 243, which may be referred to as "control wires," are separately connected to the contact buttons 213, one for each one of the eight control switches 206. (Figures 32 and 32a.) The center contact button 212 of each control switch 206 is connected to the sleeve 182 of the particular selector switch 181 with which its control switch 206 is associated and thus through such sleeve 182 to the contact arm 200 thereof.

Also mounted in any convenient position in the rear side of the scoreboard A is a junction box D provided with a conventional double pole single throw A. C. line switch having suitable protective fuses 245. Preferably mounted in the junction box D is a conventional selenium rectifier 246 and electrolytic condenser 247 connected across A. C. lead wires 248, 249, coming from the line switch 244, and having a D. C. off-take lead 250. It will be noted that the A. C. lead wire 249 is, in effect, the "ground" wire and is common to both the A. C. circuits and D. C. circuits. Thus, all D. C. circuits are, in effect, connected across the D. C. off-take lead wire 250 and the ground wire 249.

The cables 242, and 235 from the control box c, and the several pairs of cables 237, 152, from the lamp boxes b all run into the junction box D and are therein connected by conventional connector plugs and plug-receptacles to complete the circuits shown in the wiring diagram, Figures 32 and 32a. The connector-plugs and receptacles as such are not shown, however, but instead, for purposes of greater clarity, the actual connections of the circuit are shown schematically.

Referring now to Figure 32, it will be seen that the ground line of 249 which serves as a ground for both the alternating current and direct current circuits, is connected to the lead wire 235 running to the manual control switches 206. The direct current line 250 is connected to each of the prongs 149 and thence to the terminal 120 of each solenoid coil 119. The alternating current line 248 is connected to each of the prongs 148 and thence through lines 138 and 142 to each of the contact blades 38 of the stator disks 32, 33, 34, 35, 36, in each of the rotary switches 20. The ground wire 249 is also connected to each prong 150 and thence through the line 140 to the common light circuit lead wire 143 in each of the lamp boxes b. Finally, the control wire 236 is connected solely to the prong 151 associated with one lamp box b and thence through lead wire 141 to the interrupter contact point 110. Similarly, the control wire 237 is connected solely to the prong 251 of another lamp box b and so on, so that each of the control wires 236, 237, 238, 239, 240, 241, 242, 243, is solely associated with one particular lamp box b. Thus, it will be seen that each lamp box b is uniquely connected to one particular manual control switch 206 and its associated selector switch 181.

Since each of the lamp boxes b is controlled in the same manner to display the particular number desired, the operation of the scoreboard A will be described with reference to the particular lamp box b in the lower right hand corner of the scoreboard shown in Figure 1, in which, for example, fourteen of the twenty-six lamp bulbs 19 are illuminated to present a light pattern reading "8." For purposes of clarity in illustration, the lighted lights in the various number patterns are shown in Figure 1 as full-line circles, the unlighted lights being omitted.

The line switch 244 is closed to place the scoreboard A in operative condition. Then the operator turns the pointer 202 of the lower right-hand selector switch 181 (reference being made to Figure 32a) of the control box c to the graduation "8" thereon. In this position, the contact button 187 corresponding to the number selected, i. e. "8," is in contact with the contact arm 200 and hence such contact button 187 will be "live," so to speak. The push-button 217 of the control switch 206 associated with such selector switch 181 is then pushed downwardly to close the circuit between the ground wire 249 and the control line 243, and also, through the contact button 187, the lead wire 228, and the lead wire 158 to the contact blade 38' located in segment "four" of stator disk 31 in the rotary switch 20 associated with the particular lamp box *b* under discussion. Direct current is thus conducted directly through the interrupter arm 108 to the solenoid coil 119 for closing the circuit thereto. Upon the closing of this circuit, the solenoid 112 is thereby activated for causing the shaft 115 to rotate thereby rotating the shaft 41. Upon rotation of the shaft 115 the finger 124 on the ratchet wheel 122 will engage the arm 132 of the dielectric plate 129 causing the cam lobe 133 thereof to abut against the interrupter arm 108 swinging the latter outwardly and thereby breaking the contact between the contact points 109, 110, so that the circuit will be momentarily opened to stop continued rotation of the shaft 115. Through the action of the spring 123 the shaft 115 will be rocked backwardly to its original position. Such return movement of the shaft 115 will cause the finger 124 to abut against the other arm 128 of the dielectric plate 129 and cause it to be rocked to its original position, out of contact with the interrupter arm 108, thereby permitting the interrupter member 100 to return into circuit closing position. Upon such reclosing of the circuit, a similar cycle of rotation of the shaft 115 is effected. Thus each successive impulse through the solenoid coil 119 will cause the shaft 41 and the rotor disks 51, 52, 53, 54, 55, and 56 to progress in successive steps from first position to second position and so on around. Thus, the contact tongue 58 on the rotor disk 48 is advanced step by step. After the fourth impulse the contact tongue 57, and with it the rest of the switch 20, will move into fifth position. In this position, the contact tongue 58 will come into contact with the contact blade 38' which is "hot" so to speak, by reason of connection through the selector switch contact button 187 to the ground wire 249. Current is thus transmitted through the contact element 57 to the contact blade 38 associated therewith and thence through the hold-in resistor 164 to the solenoid coil 119, in effect, by-passing the interrupter arm 108 and causing the solenoid 112 to stop in that position. The resistor 164, of course, consumes the bulk of the current and transmits only enough current to hold the solenoid 112 in closed position without damaging the coil 119. Thus the rotary switch will stop in its fifth position and in such position a light pattern visually forming the numeral "8" will be established as previously described.

When the push-button 217 is released the solenoid coil 119 will become de-energized and the solenoid 112 will return to initial position ready for the next impulse, but the rotary switch will remain in fifth position until its corresponding selector switch 181 is re-set and the associated manual control switch 206 is again closed. It should be noted in this connection that the solenoid 112 will only move under a full-current impulse transmitted by closure of the manual control switch 206. Any other impulses which may fortuitously come through the common eleven-wire cable 152 will be blocked out in the resistor 164.

The total time elapsed between pressing the requisite push-button 217 and the ultimate illumination of the selected light pattern upon the associated lamp box *b* is infinitely small so that the various intermediate light patterns which will be instantaneously effected during the movement of rotary switch 20 through its first four positions will be so fleetingly presented that they will be incapable of intelligible reading and hence to all outward appearances it will seem that the desired light pattern is immediately established upon operation of the proper control switch 206.

It is, of course, obvious that the various rotary switches 20 could be modified by the provision of additional disks and connected to an appropriate number of lamp bulbs to permit the presentation of letter-forming patterns, if desired.

It should be understood that changes and modifications in the form, construction, arrangement, and combination of the several parts of electrically actuated scoreboards may be made and substituted for those herein shown and described without departing from the nature and principle of our invention.

Having thus described our invention what we claim and desire to secure by Letters Patent is:

1. A signboard comprising a plurality of substantially identical units each having a group of electric lights arranged to produce different legible symbols when various lights are lighted to form selected light patterns, an operating switch associated with each unit, said operating switch having a plurality of positions, one such position corresponding to each different light pattern, driving means operatively associated with said operating switch for moving it successively from one position to another, said operating switch having a series of position-selecting contacts, a contactor movable with the switch for successively engaging one of the several position-selecting contacts in each position of the switch, a remotely located control box, a control cable running from the control box to the signboard, said cable containing one control lead for each of the identical units in the signboard, a single set of common leads, there being one such common lead corresponding to each position-selecting contact of one operating switch, such common leads being individually connected with the position-selecting contact to which it corresponds, all other position-selecting contacts of all other operating switches of the several units being connected to the particular common lead to which it corresponds, a plurality of selector switches operatively mounted in the control box, there being one selector switch for and associated with each unit, each selector switch having a series of contacts corresponding with the several position-selecting contacts of the operating switch in the unit with which such selector switch is associated, all of the corresponding contacts of each of the selector switches being connected to the common lead which is in turn connected to all of the several corresponding position-selecting contacts, each selector switch having a contact arm for optionally contacting any one of the several contacts of such selector switch, all of said contact arms of the several selector switches being connected to a common source of electric power, each of said control leads being also connected through an individual switch to the same source of power, and means connected with the contactor and the driving means for arresting movement of the driving means when the contactor engages one of the position selecting contacts which is energized as a result of transmission of electric current thereto through its corresponding control lead and selector switch contact.

2. A signboard comprising a plurality of substantially identical lamp boxes each having a group of electric lights arranged to produce different legible symbols when various lights are lighted to form selected light patterns, switching means in each lamp box for changing the light patterns in successive order, a control box having one selector switch for each lamp box, a single multi-wire cable connecting all of the switching means and selector switches in common, an auxiliary switch associated with each selector switch and being adapted upon closure to energize the selector switch, said auxiliary switch also being adapted upon closure to energize the switching means, and means associated with each switching means and its corresponding selector switch for causing the switching means to set up a light pattern established by the selector switch.

3. A signboard comprising a plurality of substantially identical lamp boxes each having a group of electric lights arranged to produce different legible symbols when various lights are lighted to form selected light patterns, switching means in each lamp box for changing the light patterns in successive order, a control box having one selector switch for each lamp box, a junction box on the signboard, said junction box having a plurality of terminals, all of said lamp boxes being connected in common to the various terminals of the junction box, a single multi-wire cable connecting the various terminals of the junction box to the various selector switches of the control box, an auxiliary switch associated with each selector switch and being adapted, upon closure to energize the selector switch, said auxiliary switch also being adapted upon closure to energize the switching means, and means associated with each switching means and its corresponding selector switch for causing the switching means to set up a light pattern established by the selector switch.

GEORGE R. CHERVENKA.
ROBERT E. KANE.

REFERENCES CITED

The following references are of record in the file of this patent:

UNITED STATES PATENTS

| Number | Name | Date |
|---|---|---|
| 883,992 | Wentz | Apr. 7, 1908 |
| 2,001,124 | Cooke | May 14, 1935 |
| 2,113,348 | Atchison | Apr. 5, 1938 |
| 2,177,938 | Hamilton | Oct. 31, 1939 |

FOREIGN PATENTS

| Number | Country | Date |
|---|---|---|
| 338,849 | Great Britain | Nov. 18, 1930 |
| 439,169 | France | June 7, 1912 |
| 492,562 | Great Britain | Sept. 22, 1938 |